United States Patent [19]

Smith

[11] 4,288,464
[45] Sep. 8, 1981

[54] FLAVOR ENHANCER

[76] Inventor: Walton J. Smith, Rte. 4, Grafton, N.H. 03240

[21] Appl. No.: 86,432

[22] Filed: Oct. 19, 1979

Related U.S. Application Data

[63] Continuation of Ser. No. 904,890, May 11, 1978, abandoned.

[51] Int. Cl.³ .............................................. A23L 1/236
[52] U.S. Cl. .................................... 426/548; 426/536; 426/650; 426/804; 424/10; 424/335
[58] Field of Search ............... 426/548, 650, 658, 804, 426/649, 536; 424/10, 335

[56] References Cited

U.S. PATENT DOCUMENTS

| | | | |
|---|---|---|---|
| 1,998,179 | 4/1935 | Wolf | 426/649 |
| 2,865,761 | 12/1958 | Leo et al. | 426/548 |
| 3,118,772 | 1/1964 | Locher et al. | 426/548 |
| 3,296,079 | 1/1967 | Griffin | 426/548 X |
| 3,320,074 | 5/1967 | Gebhardt | 426/548 X |
| 3,653,922 | 4/1972 | Schmitt et al. | 426/548 |
| 3,761,288 | 9/1973 | Glicksman et al. | 426/548 |

FOREIGN PATENT DOCUMENTS

| | | | |
|---|---|---|---|
| 46-6829 | 2/1971 | Japan | 426/548 |
| 48-30390 | 9/1973 | Japan | 426/533 |

*Primary Examiner*—Esther M. Kepplinger
*Attorney, Agent, or Firm*—Larson and Taylor

[57] ABSTRACT

Enhancing the flavor of artificial sweetening compositions by the addition of maltol.

8 Claims, No Drawings

FLAVOR ENHANCER

This is a continuation of application Ser. No. 904,890 filed May 11, 1978 now abandoned.

This invention pertains to an artificial sweetener composition which has considerable superiority over previously available products. It also pertains to improvements in the artificial sweetener components.

This invention relates to edible compositions intended to be added to foods, including beverages, to enhance their flavor, which is to say that it relates to flavor enhancers and to their production. It is particularly, but not exclusively, concerned with flavor enhancers that can be used by the consumer, and will in use, frequently be added to a foodstuff as a final step in its preparation, just prior to its consumption.

A further object of this invention is in increasing the safety of frequent use of artificial sweeteners without adversely affecting their usefulness.

Some examples of common flavor enhancers are salt and sugar, as well as spices and artificial sweeteners in various forms. The present invention is particularly concerned with sweetening agents, and indeed, it is an object of the invention to provide a water-soluble, sweetening flavor enhancer. Currently available artificial sweeteners, especially saccharin-based ones, have the disadvantages of imparting to foods what many people consider to be an undesirable flavor; this is particularly true when they are used to sweeten the common beverages coffee and tea, and also fruit juices. Thus, it is a further object of this invention to provide a water-soluble flavor enhancer which has improved organoleptic effects when used to sweeten some common beverages.

Maltol, 3-hydroxy-2-methyl-4-pyrone and its ethyl homologue are recognized food additives that are used in the baking industry to impart a "freshly baked" odor and flavor to bread and cakes. It is also used in chocolate and other products.

The present invention is based upon my discovery that maltol and artificial sweeteners have a synergistic effect upon the organoleptic system when used together. In particular, when a flavor enhancer comprising these ingredients, with the sweetener in substantial excess over the maltol, is used by the consumer to sweeten foods and beverages that are otherwise ready for consumption, an excellent, improved and novel effect is perceived. Taste sensations are of course most difficult to describe. The effect can perhaps best be described as a sweetening which directly enhances and emphasizes the natural flavor of the product to which the enhancer is added. A pleasant after-taste is obtained and the somewhat bitter aftertaste often perceived with saccharin appears to be suppressed.

In practicing this invention, I have used maltol or its homolog at levels not previously used in flavor enhancement, and in fact, the maltol not only enhances the flavor in my product but it supplies some of the flavor itself.

Whilst this flavor-enhancing composition has some very desirable properties, there is, however, a practical problem in compounding maltol with an artificial sweetener. As with any other composition, it is of course necessary and desirable for the ingredients to be intimately and homogeneously mixed. Mechanical dispersion by grinding and mixing is one possibility, however, it is difficult to get uniformity. The preferred method of production is by drying an aqueous solution of the two ingredients. However, this approach is hampered by the low solutility of maltol, about 0.01 gm/ml at 25° C., which causes the maltol to precipitate prematurely and separately.

I have further discovered that maltol and an artificial sweetener can be satisfactorily compounded from an aqueous solution by including in that solution a water-soluble, edible carbohydrate, and then drying the solution preferably by freeze- or spray drying.

Accordingly, the present invention provides a flavor enhancer comprising an intimate, substantially homogeneous and stably dispersed mixture of ½ to one part by weight of maltol with from 1 to 5 parts by weight of an artificial sweetener.

The invention also provides a method of producing the flavor enhancer by drying an aqueous solution of a composition comprising one part by weight of maltol from 1 to 5 parts by weight of an artificial sweetener with sufficient of a water-soluble, edible carbohydrate to inhibit premature crystallization of the maltol. 3-Hydroxy-2-ethyl-4-pyrone can be used in place of maltol, or a mixture of the two can be used.

The invention particularly provides a freeze-dried or spray dried composition of one part by weight maltol or 3-hydroxy-2-ethyl-4-pyrone, from 1 to 5 parts by weight of an artificial sweetener, and from 1 to 5 parts or even more of a water-soluble, edible carbohydrate. The preferred range of artificial sweetener is around 3 parts, say from 2½ to 3½. With 3 parts of sweetener, five or more parts of carbohydrate gives excellent results.

The carbohydrate can be lactose, sucrose, or milk powder; even hexitols, for example mannitol or sorbitol can be used, but I prefer to use a starch hydrolysate. I have found a low DE in the range of 5 to 30 to be especially desirable. A hydrolysed corn starch with a DE of about 10, for example Maltrin 10 (a registered trade mark of Grain Processing Co., Muscatine, Iowa) gives good results.

Following the method of this invention a product of excellent constitution can readily be obtained; an attractive, granular fast-dissolving composition usually results.

The artificial sweetener can be any of those customarily used, especially saccharin. When the flavor enhancer is used to sweeten an acid product, for example citrus fruit juice, the inclusion of about twice as much cyclamate as saccharin gives better results.

There are several additional ingredients that can be included in the flavor enhancer, if desired, to serve their customary purposes. Vitamin C is one. Buffers, for example, calcium gluconate or ascorbate are others. Flavorants, for example cocoa can also be included. These additional ingredients are included in quantities that take into account the fact that the flavor enhancer is normally used in small quantities; they may thus comprise a substantial proportion of the composition, up to 50% by weight of it. Other flavorants, colorants, vitamins, buffers, stabilizers or preservatives can of course be added as desired.

The consumer will normally desire quite small quantities of the flavor enhancer of this invention, perhaps one-tenth or one-twentieth the amount of sugar he would use. Individuals will of course vary the amount according to taste, and can quickly establish their preferred quantity with experience. The flavor enhancer of this invention is excellent in coffee, tea, orange juice and grapefruit juice. It is surprisingly good in some wines and also on cereals. Flavored with cocoa, it makes a delicious sweet condiment, excellent for topping desserts, fruit and puddings.

There has been some meager evidence that the artificial sweeteners saccharin and cylamate are not totally safe in frequent use. It is obvious that "frequent" use is open to wide interpretation. While I am undecided whether there is any validity to this speculation, except that in the event of excessive use, there seems to be a possibility of adverse effects based on the definition of "excessive". Accordingly I have studied the biological effects of these two artificial sweeteners in dozens of experiments, and I believe that the product which I visualize would overcome any objections of those normally taking a negative view.

In the case of Cyclamate, there does not seem to be any direct biological effect. In the event that it is hydrolyzed to cyclohexylamine in certain people, there is a possibility in excessive use that it might cause some testicular atrophy. I have therefore made a thorough study of the biological effects of cyclohexylamine with the purpose of establishing which if any substance could be added to my flavor enhancer to decrease the risk in the event of the formation of cyclohexylamine after consumption, and in the event of excessive use.

In the case of saccharin, I have described a product and a method for decreasing the risk in the event of excessive use, and this is described in a separate patent application Ser. No. 73,796, filed Sept. 10, 1979. In essence, I have discovered that a combination of from 0.5 to 1.5 parts of urea for every part of saccharin in the product decreases the risk of excessive use of this artificial sweetener. I have made a saccharin salt or compound with urea for this purpose also.

In the case of cyclamate, and in turn for cyclohexylamine, I have found that I can reduce the risk of excessive use by the presence of the cations of sodium, potassium primarily and calcium and magnesium secondarily. This can be accomplished by using cylcamate salts of these cations. As a practical matter, it is not absolutely imperative that all four of these be used, but a mixture of Sodium Cyclamate and Potassium Cyclamate is recommended, with the possible addition of some Calcium Cyclamate, and with the option also of including magnesium and other cations.

My novel observation is that Cyclohexylamine (as a neutral salt) interferes with the metabolism of certain cations, but more strongly with monovalent cations of Group I. It interferes primarily with the metabolism of sodium and potassium, and secondarily with calcium and magnesium.

Only a minority of people metabolise some of the consumed cyclamate to cyclohexylamine, however, most consumers do not know which group they are in. Superimposed on these individual variations are variations in food intake.

Cyclamate has usually been consumed in foods and drinks as the sodium salt hence no supplementation with sodium has ever been needed. My discovery which includes the use of potassium cyclamate (and possibly other cations) as well, combined with sodium cyclamate eliminates the possibility of interference with the metabolism of these cations.

Cyclohexylamine is "hydrogenated aniline". I have discovered that much of the biochemical antagonism of aniline and related aromatic amines as well as that of related compounds to cyclohexylamine may be overcome with the same cations.

It seems possible that one might use all one form of Cyclamate, such as Sodium Cyclamate, and then supplement the composition with other salts of potassium, calcium, and magnesium, however, this is not necessarily the preferred composition since the same effect can be accomplished by the use of salts of Cyclamate. However, in the event that the Cyclamate level is quite low, a mixture of sodium and potassium Cyclamate might not provide enough of these cations, and it then might be necessary to supplement the formulation with other salts of these cations.

It is worth noting that Cyclamate is rarely degraded to Cyclohexylamine, and even when it is, this is only a partial degradation, hence most compositions using the combination shown above would be satisfactory to deal with any traces of Cyclohexylamine formed.

My preferred composition of cyclamates is 10 to 50% Sodium Cylamate, 10–50% Potassium Cyclamate, 10 to 50% Calcium Cyclamate, and 0 to 50% Magnesium Cyclamate. Within these ranges, I visualize a desirable combination to comprise 50% Soium Cyclamate, 40% Potassium Cyclamate, and 10% Calcium Cyclamate. These compositions would be used in the aforementioned flavor enhancer. I often prefer a combination of saccharin and cyclamate, and in the described flavor enhancer, I often use two parts of Cyclamate as salts as described and one part of Saccharin. Since Saccharin is usually used as the salt, the proper balance of inorganic cations can be achieved also with the choice of a suitable salt of Saccharin, though for the moment I prefer the urea salt of saccharin.

There are a large number of artificial sweeteners which may be used in formulating my flavor enhancer, and my description of compositions with increased safety are described currently because of their low cost, as well as because of years of experience in their use with no obvious evidence of safety in moderate use.

Soft drinks may safely be sweetened without sugar using a mixture of sodium, potassium, and calcium cyclamate as described above.

My invention is not limited to a specific composition, however, the following formulation of the flavor enhancer is excellent and falls within the scope of my invention:

| Sodium Cyclamate | 4 grams |
|---|---|
| Potassium Cyclamate | 3 |
| Magnesium Cyclamate | 1 |
| Calcium Saccharin | 4 |
| Urea | 2 |
| Maltol | 6 |
| Sodium Ascorbate | 4 |
| Maltodextrin (10 DE) | 25 |

The above mixture is mixed until uniform. About 1% silica gel may be added to improve flow characteristics. Otherwise than simple mixing, it may be dissolved in water and spray-dried or freeze-dried. If it is freeze-dried, the dilution should be adequate so that the freezing point is above −20° D.

This flavor enhancer even after freeze- or spray-drying has a sweet smell as well as a sweet taste.

I claim:

1. A flavor enhancer prepared by drying an aqueous composition comprising 1–5 parts of artifical sweetener, ½ to 1 part maltol or ethyl maltol, and 5 to 10 parts of a soluble low DE polysaccharide.

2. Claim 1 in which an artificial sweetener is a cyclamate.

3. Claim 2 in which the cyclamate is comprised of at least two salts selected from the cation group, sodium, potassium, calcium, and magnesium.

4. Claim 3 in which the salts are sodium, calcium and potassium cyclamate.

5. Claim 4 in which the salts are sodium and potassium cyclamate.

6. Claim 1 in which the artificial sweetener is a combination of salts of cyclamate and saccharin.

7. A flavor enhancer comprising 1-5 parts of a combination of salts of cyclamate and saccharin, said cyclamate consisting of salts of sodium, potassium and calcium and said saccharin being supplemented with urea, ½ to 1 part maltol or ethyl maltol and 5 to 10 parts of a soluble low DE polysaccharide.

8. In a method of producing a flavor enhancing composition by drying an aqueous solution of 1-5 parts artificial sweetener and ½ to 1 part maltol or ethyl maltol, the improvement which comprises adding to said aqueous solution, prior to said drying, 5 to 10 parts of a low DE polysaccharide so as to inhibit crystallization of said maltol or ethyl maltol during said drying.

* * * * *